United States Patent [19]
Gibson

[11] 3,736,511
[45] May 29, 1973

[54] AUTOMATIC DECISION THRESHOLD ADJUSTMENT

[75] Inventor: Earl D. Gibson, Huntington Beach, Calif.

[73] Assignee: North American Rockwell Corporation, El Segundo, Calif.

[22] Filed: June 11, 1971

[21] Appl. No.: 152,123

[52] U.S. Cl. ....................325/321, 235/154, 325/38, 325/42

[51] Int. Cl. ....................G06f 3/00

[58] Field of Search ....................235/154; 325/42, 325/38 A, 65, 321

[56] References Cited

UNITED STATES PATENTS 3,633,105 1/1972 Lender....................325/42
3,634,765 1/1972 Gubleber....................325/42
3,492,578 1/1970 Gerrish....................325/38 A
3,597,541 8/1971 Proakis....................325/42

*Primary Examiner*—Maynard R. Wilbur
*Assistant Examiner*—Jeremiah Glassman
*Attorney*—L. Lee Humphries, H. Fredrick Hamannand Edward Dugas

[57] ABSTRACT

The automatic decision threshold adjuster of the present invention is comprised of a decision device which compares a sampled received data signal against a set of automatically adjusted reference levels to provide an estimate of the level of the received digit and a signal indicative of the sign of the received digit. Means are connected to the decision device to provide for learning the different in amplitude levels of the two main samples of the data transmission system impulse response. Adjustable reference level means are provided for receiving the stored amplitude samples and for providing a set of adjustable reference level signals which are adjust to respectively corresponding predetermined proportions of the difference between the two amplitude samples.

13 Claims, 3 Drawing Figures

Patented May 29, 1973 3,736,511

3 Sheets-Sheet 1

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY Edward Dugas
ATTORNEY

AUTOMATIC DECISION THRESHOLD ADJUSTMENT

BACKGROUND OF THE INVENTION

In the high speed data communication art, multilevel digital signals are decoded by comparing the polarity (sign) and amplitude of the multilevel signal against a set of fixed decision thresholds to determine what signal level was transmitted. One conventional approach is to use fixed decision thresholds together with an automatic gain control which adjusts the root-mean-square (or general long term average) of the received signal level to correspond to the fixed decision thresholds. In high performance multilevel data communications over channels with substantial signal distortion, a substantial performance degradation results from the innacuracy in any known previous automatic means of adjusting the decision thresholds or adjusting the general long-term level of the received signal to correspond to fixed decision thresholds.

Applicant's system provides decision threshold levels that adapt precisely to a varying received signal level even when the channel introduces large signal distortion and noise.

SUMMARY OF THE INVENTION

In the preferred embodiment of the invention there is provided a decision device which compares a sampled received signal against a set of adjustable reference levels to provide an estimate of the value of each received digit and a signal indicative of the sign of the received digit. Means responsive to the signals from the decision device provides for a learning and storing of the polarity and amplitude levels of two main amplitude samples of the overall data transmission system impulse response. An adjustable reference level generating means is provided for receiving the stored, learned, amplitude samples and to provide a set of adjustable reference level signals which are set proportional to the difference between the two stored amplitude samples.

It is, therefore, an object of the present invention to provide an improved decision device for detecting multilevel digital signals.

It is another object of the present invention to provide an improved decision device for detecting the level and polarity of a multileveled sampled signal.

It is a further object of the present invention to provide a decision device with adjustable reference levels, the adjustment of which is made in accordance with changes in parameters of the transmission path.

These and other objects will become more apparent and better understood when taken in conjunction with the following description and drawings, throughout which like characters indicate like parts and which drawings form a part of this application.

DESCRIPTION OF THE PREFERRED EMBODIMENT

Figure 1:
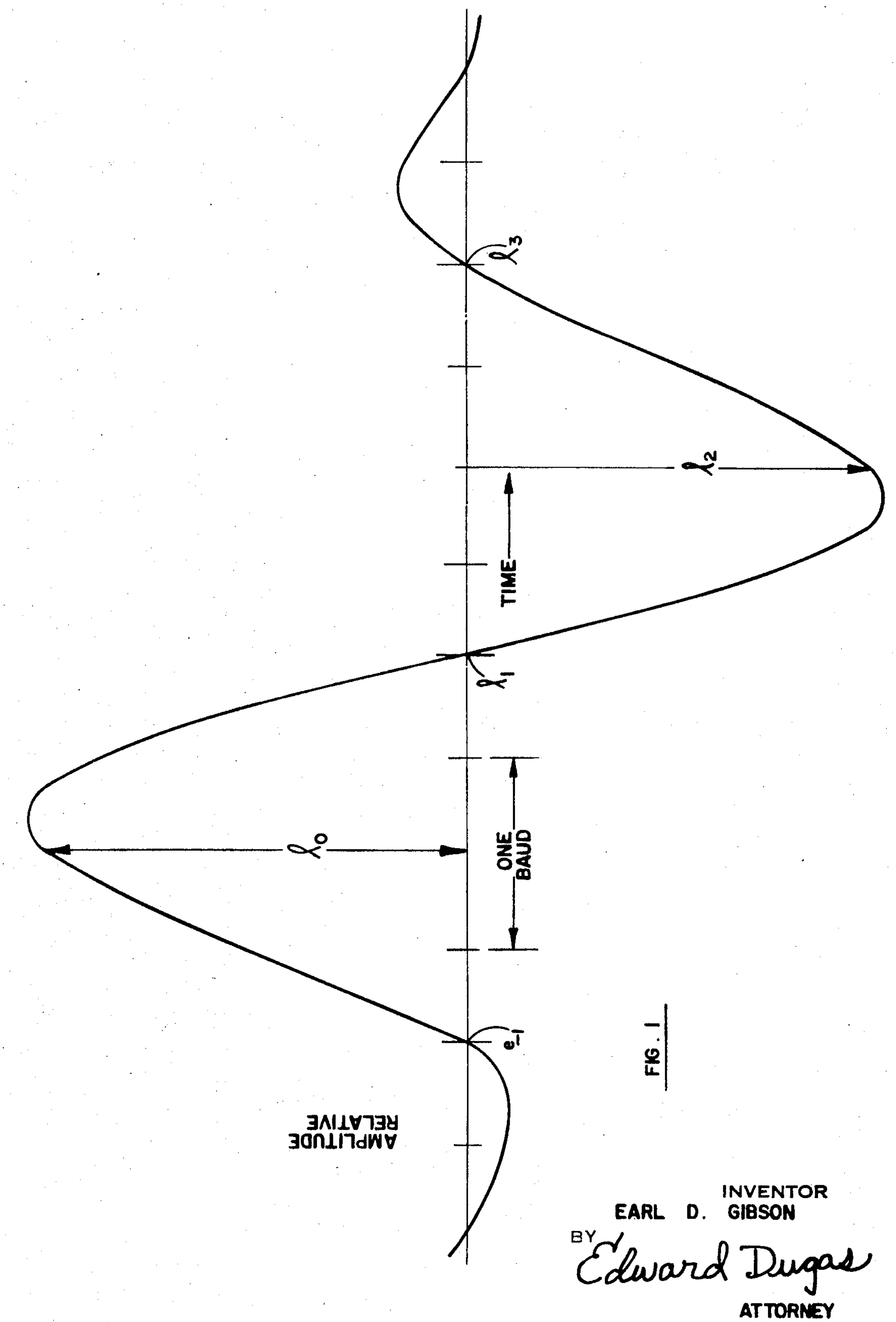
FIG. 1 illustrates a transmission system impulse response curve which is useful in understanding the operation of the invention.

FIG. 1 shows an example of a single-digit (or pulse) response of an overall data transmission system using a particular method of partial response signaling. For illustrative purposes, a form of the automatic decision threshold adjustment equipment suitable for use with this type of signaling will be described; but, after studying this description, it will become obvious that the same basic approach to automatic decision threshold adjustment can also be applied to other types of signaling. Sampling occurs at the baud rate; and in the particular method of partial response signaling, the pulse response has two main amplitude samples designated $l_0$ and $l_2$. For each individual transmitted digit, the decision device receives this sampled pulse response multiplied by one of several possible integers, such as ±1 and ±3. In a stream of received digits, the received signals overlap so that the $i^{th}$ signal sample received by the decision device is approximately.

$$y_i \approx l_o d_i + l_2 d_{i-2} \approx l_o D_i \quad 1$$

$$(10) \approx [(l_o - l_2)/2]\ D_i$$

where $D_i = d_i - d_{i-2}$ 2.

In 4,7 level partial response signaling, for example, each transmitted digit $d_i$ has one of four possible values ±1 and ±3; whereas, each received $D_i$ has one of seven possible values 0, ±2, ±4 and ±6.

The objective of the equipment described herein is to set the proper reference signal levels (decision threshold levels) for evaluating the seven-level digits, the $\{D_i\}$ 9 from $y_i$. The four-level digits, the $\{d_i\}$ need not be evaluated because it is the $\{D_i\}$, not the $\{d_i\}$, that are decoded into the final output digits of the receiver.

Figure 2:
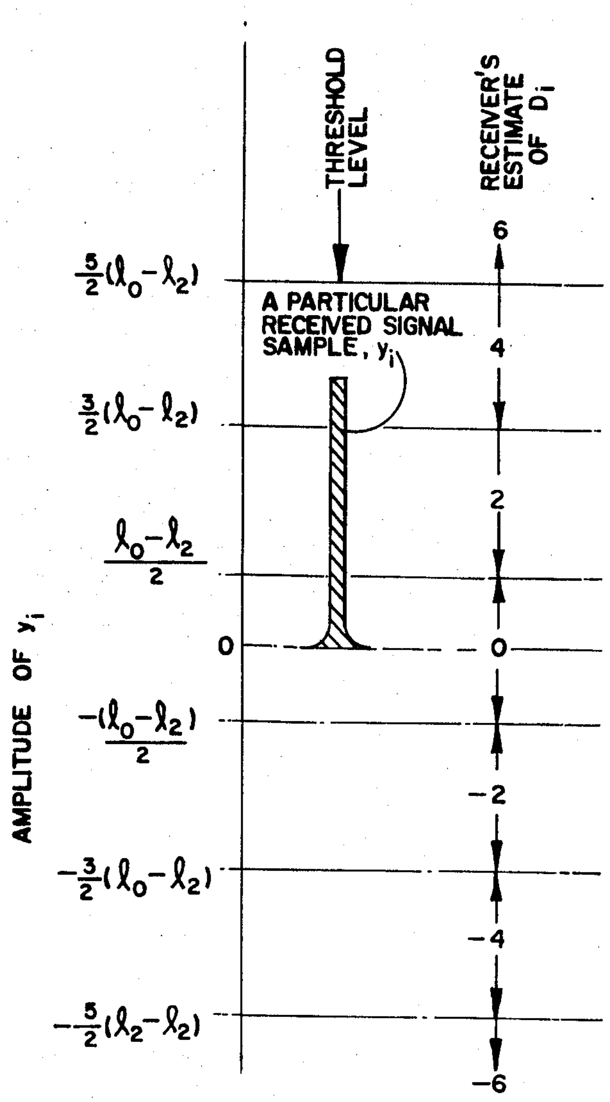
FIG. 2 illustrates a typical received signal sample compared against the adjustable threshold levels for determination of the polarity and amplitude of the received signal sample.

FIG. 2 illustrates the desired decision threshold levels and the associated values of the received digits. What occurs in the present device is a comparison of the amplitude of the sampled received signal against the threshold levels shown. For example, when the received signal sample, $y_i$, is found to fall between the amplitude values $3/2\ (l_0 - l_2)$ and $5/2\ (l_0 - l_2)$, the digit value $D_i$ is estimated to be +4. In particular, the scheme shown is designated a 4, 7 level partial response signaling scheme where each $d_i$ has four possible values and each $D_i$ has seven possible values. Ideally, $$(l_o - l_2)/2 = l_o = -l_2 \quad 3$$

but this ideal condition is not always accurately achieved. One of the advantages of the approach described above is that both main pulse response samples $l_o$ and $l_2$ are considered in establishing the decision threshold levels. This leads not only to considering the unbalance in $l_o$ and $l_2$, but to better signal-to-noise performance in automatically setting the thresholds than would be achieved by considering either $l_o$ or $l_2$ alone. Furthermore, by avoiding use of the 4-level digit decisions in establishing the thresholds, we avoid error propagation (burst error effects) that would be prevalent in these decisions.

Figure 3:
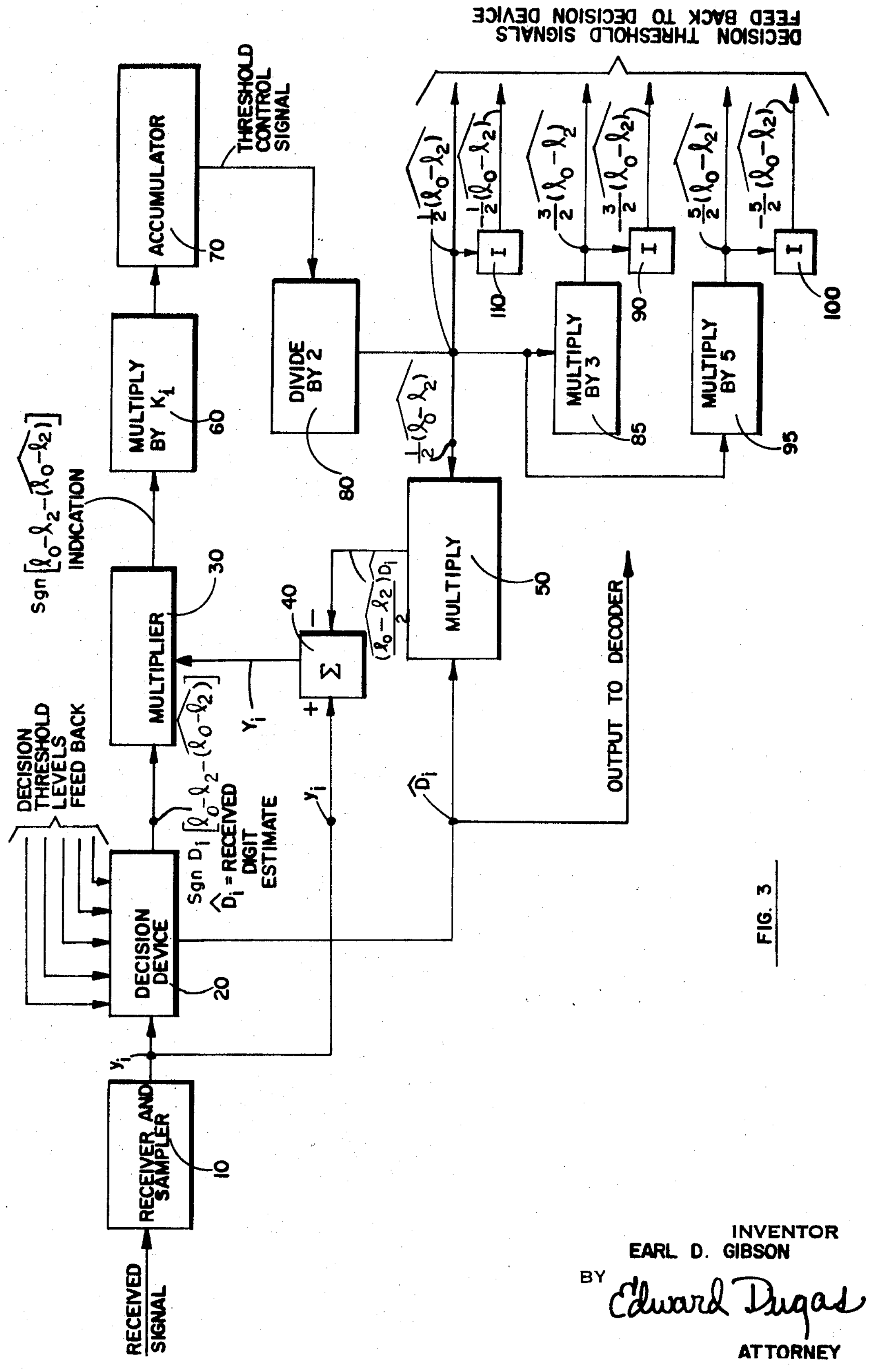
FIG. 3 illustrates the preferred embodiment of the invention in block diagram form.

Referring now to FIG. 3 which illustrates the preferred embodiment of the automatic decision threshold adjuster, the receiver 10 can be any receiver used in a synchronous data communication system with any linear type of modulation-demodulation. However, for the particular implementation of the automatic decision threshold adjuster shown in FIG. 3, the receiver must be designed for the particular method of partial response described above. The decision device 20 in FIG. 3 is a device that observes the level of the signal $y_i$ at the output of the receiver once each baud time and evaluates the digit received during this baud time. It is a conventional type of device that compares each signal sample with a number of decision threshold levels, such as those illustrated in FIG. 2, and evaluates the received digit $D_i$ on the basis of this comparison. A decision device that may be used with the present invention is disclosed in U. S. Patent Application, Ser. No. 10,332, entitled "High Speed Digital Transmission System", by Earl D. Gibson, the present inventor.

The operation during the $i^{th}$ digit time interval will be explained. The digit decision $\hat{D}_i$ is obtained from the decision device 20. Multiplier 50 multiplies this decision by the quantity $$(\widehat{l_o - l_2})/2 \qquad 4$$

which will be automatically learned, as explained below. The summation device 40 subtracts the output of multiplier 50 from $y_i$, the $i^{th}$ signal sample from the receiver's output. The output of the summation device 40 is multiplied by the sign signal Sgn $\hat{D}_i$, the polarity of the $i^{th}$ digit decision, which sign signal is available from the decision device. The output of multiplier 30 is multiplied by a small constant, $k_i$ in the multiplier 60 and then fed to the accumulator 70 as an incremental adjustment of the threshold control signal. Thus, once each baud time the content of the accumulator 70, which represents the learned threshold control signal, $\widehat{l_o - l_2}$, is incremented by $\pm k_i$. The accumulator 70, which may be an UP-DOWN counter, must be capable of accepting both positive and negative increments.

As explained below, on an averaging basis, this incrementing process drives the accumulated estimate $\widehat{l_0 - l_2}$ to an approximately correct value, although some of the individual increments are in the wrong direction.

The purpose of multiplier 60 is to establish the size of the incremental adjustments of the $\widehat{l_o - l_2}$ estimate, which is stored in the accumulator. The adjustment increment size can be fixed or can be made proportional to the estimated error $l_o - l_2 - (\widehat{l_o - l_2})$. For fixed increment operation, difference means 40 and multiplier 30 can have binary (sign) outputs. Then, multiplier 60 can be eliminated by arranging the accumulator and other digital scale factors so that a count of $2^{13}$ in the accumulator represents approximately the correct value of $l_o - l_2$ and incrementing the accumulator by a count of +1 or −1 once each baud time. This makes the increment size approximately equal to $\pm 2^{-13}(l_o - l_2) \approx 2^{-12} l_o$. This relatively small increment size is selected to obtain essentially a long-term averaging effect to average out the effects of random data and noise. In other words, if the noise and random data cause an error of a few increments, this error is still relatively small. In the fixed increment version the accumulator 70 should be large enough to accumulate approximately 14 bits, counts between zero and $2^{14}$, so that it can accommodate a maximum count of approximately twice the nominal expected value of $l_o - l_2$.

A better combination of adjustment speed and precision can be obtained by making the increment size proportional to the error $l_o - l_2 - (\widehat{l_o - l_2})$. Then, difference means 40 and multiplier 30 must generate outputs that have magnitude as well as sign; and, multiplier 60 multiplies by a constant $k_i \approx 2^{-9}$ on a scale where $l_o$ equals unity. Each increment size is then approximately equal to $\pm 2^{-9}[l_o - l_2 - (\widehat{l_o - l_2})]$. Then, the accumulator has approximately 16 binary stages and is arranged so that a nominal correct value of $l_o - l_2$ is represented by a count of approximately $2^{15}$ in the accumulator. When the error $l_o - l_2 - (\widehat{l_o - l_2})$ is small, each increment size is approximately $2^{-15}[l_o - l_2 - (\widehat{l_o - l_2})]$, which results in very long term averaging with very precise learning; whereas, when the error is larger, the increment size becomes larger for fast adjustment. 17x1

In either the fixed increment version or the adjustable increment version, it is desirable to start with an approximately nominal correct, pre-calculated, value of $l_0 - l_2$ stored in the accumulator at the beginning of operation, although this is not essential, as will become more clear below.

The threshold control sigal $l_0 - l_2$ is divided by 2 in divider 80 and fed back to multiplier 50. A sign changer 110 receives the signal ½ $(l_o - l_2)$ and provides an output equal to − ½ $(l_o - l_2)$.

Since the needed decision thresholds are odd multiplies of $(\widehat{l_0 - l_2})/2$ (refer to FIG. 2), implementation can be accomplished by multiplying by 3 with block 85; multiplying by 5 with block 95; and using the sign changers 90, 100 and 110 to convert the sign of signal $l_0 - l_2/2$ into the needed decision thresholds ½ $(l_0 - l_2)$, −½ $(l_0 - l_2)$, 3/2 $(l_o - l_2)$; −3/2 $(l_0 - l_2)$, 5/2 $(l_o - l_2)$, and −5/2 $(l_o - l_2)$.

Basis of the Approach

The error component of the signal sample $y_i$ is $$Y_i = y_i - [(\widehat{l_o - l_2})]/2D_i \qquad 5$$

as implemented by the summation device 40 of FIG. 3.

From equations (1) and (2), when the digit decision $D_i$ is correct $$Y_i \approx (l_o - (\widehat{l_o - l_2})/2)\, d_i + (l_2 + (\widehat{l_o - l_2})/2)\, d_{i-2} \qquad 6$$

In normal operation, a large percentage of the digit decisions are correct, so this equation is correct nearly all of the time; and we can ignore the effects of erroneous digit decisions on the averaging (or incrementing) operations described below. If we multiply $Y_i$ by $D_i$ and average the product over many samples, we obtain $$\widetilde{Y_i D_i} \approx \left[\left(l_0 - \frac{\widehat{l_0 - l_2}}{2}\right) - \left(l_2 + \frac{\widehat{l_0 - l_2}}{2}\right)\right]K$$

$$= \left[l_0 - l_2 - (\widehat{l_0 - l_2})\right]K \qquad \text{Eq. (7)}$$

where $\sim$ denotes the average over many random combinations of digits, K is a constant because terms of the form $d_i d_j$ average to a constant when $i = j$ and average to zero when $i \neq j$. The result in equation (7) is simply a constant times the error in the equipment's estimate $\widehat{l_0 - l_2}$.

From equation (7) we note that, for a particular error $l_o - l_2 - (\widehat{l_o - l_2})$, $$\widetilde{Y_i\,(\mathrm{Sgn}\,D_i)} = k_2[l_o - l_2 - (\widehat{l_o - l_2})] \qquad 8$$

where $k_2$ is another constant and the averaging is over many random combinations of digits. Therefore, the output of multiplier 30, which is $Y_i \mathrm{Sgn}\,\hat{D}_i$ tends to be proportional tothe error $l_o - l_2 - (\widehat{l_o - l_2})$ and is an indication of the sign of this error. Because of the averaging relationship in equation (7) the error sign indication obtained at each individual baud time is correct most of the time and can be used to increment the estimate $\widehat{l_o - l_2}$ in the correct direction most of the time. This fact shows that when the estimate $\widehat{l_o - l_2}$ is low, the output of multiplier 30 of FIG. 3 will be positive more often than negative, causing the contents of the accumulator to grow larger, thereby correcting the error in the estimate of $\widehat{l_0 - l_2}$. A positive error in the estimate $\widehat{l_0 - l_2}$ is corrected in a similar, reverse manner.

Suppose, for example, that at the beginning of operation the estimate $\widehat{l_o - l_2}$ stored in accumulator 70 is too low. Then, the output of the divider 80 will also be too low. The quantities $y_i$, $\hat{D}_i$ and Sgn $\hat{D}_i$ have the same sign most of the time because $\hat{D}_i$ is a digit value estimate based upon $y_i$. Therefore, in our present example, the output $(\widehat{l_0 - l_2}\ 2/2)\ \hat{D}_i$ from multiplier 50 will tend to be too small in absolute value, smaller in absolute value than $y_i$, so that $Y_i$ and $\hat{D}_i$ will (with occasional exceptions) h ,ve the same polarity (see equation (5). The output $Y_i$ Sgn $\hat{D}_i$ from multiplier 30 will then be positive, causing the accumulator to be incremented in the positive direction, reducing the error in the estimate $\widehat{l_0 - l_2}$. When the estimate $\widehat{l_0 - l_2}$ is too high it is corrected in a similar, reverse manner. The following table summarizes the polarity relationships that exist most of the time because of the statistical average relationships involved.

Polarity Relationships

| Error in $l_0$-$l_2$ from accumulator 70 | $y_1$ and $D_1$ | Error in multiplier 50 output | Error in $Y_1$ output difference means 40 | Output of multiplier 30 $Y_1$ Sgn $D_1$ | Incremental adjustment of $l_0$-$l_2$ |
|---|---|---|---|---|---|
| − | + | − | + | + | + |
| − | − | + | − | + | + |
| + | + | + | − | − | − |
| + | − | − | + | − | − |

The polarity relationships in each row go together and the polarities in the last four columns are dependent upon the polarities in the first two columns. An understanding of these polarity relationships can be facilitated by studying this table in conjunction with equaton (5) and FIG. 3. Note that, in each case, the polarity of the incremental adjustment (last column) is such as to reduce the error (first column).

In the above discussion, we have used signals and decision threshold levels proportional to the differenee ($l_0 - l_2$) between the two main amplitude samples of the transmission system impulse response. The term $l_o - l_2$ applies to a particular method of partial response signaling. The method of automatic decision threshold adjustment described herein can be applied to other types of signalling by changing the expression $(l_o - l_2)/2$ to the more general expression "mean absolute amplitude of the non-zero amplitude samples of the idealized impulse response (or single-digit response) of the overall data transmission system."

While there has been shown what is considered to be the preferred embodiment of the present invention, it will be manifest that many changes and modifications may bv made therein without departing from the essential spirit of the invention. It is intended, therefore, in the annexed claims, to cover all such changes and modifications as fall within the true scope of the invention.

I claim:

1. An automatic decision threshold device for use in conjunction with a receiver providing a sampled multiamplitude received signal containing digit information comprising in combination:

decision means for comparing the multiamplitude sampled received signal against a set of adjustable reference level signals to provide a digit value signal which is an estimate of the amplitude value of each received digit, and a digit signal which is indicative of the sign of the received digit;

learning means for receiving the signals from said decision means and the sampled multiamplitude signal, for learning the difference of the amplitude levels of the two main samples of the overall data transmission system impulse response; and adjustable reference level generating means for receiving the learned amplitude level differences to provide the set of adjustable reference level signals, each reference level being generated as a predetermined, and respectively corresponding, proportion of the actual difference between the two main amplitude samples as learned by said learning means.

2. The device according to claim 1 wherein said learning means is comprised of:

multiplier means for forming a first product signal proportional to the product of the estimated value of each received digit and the learned difference between the amplitude levels of the two main impulse response samples;

difference means for determing the difference between the sampled multilevel digital data received signal and the first formed product signal and producing a corresponding, difference signal output;

second multiplier means for receiving the difference signal from said difference means and the sign signal from said decision means and forming a first sign product signal therefrom, the first sign product signal having the sign of the difference between the estimated difference of the amplitude levels of the two main impulse response samples and the actual difference of the amplitude levels of the two main impulse response samples;

incrementing means for providing an incremental signal of the same sign as the signal from said second multiplier for each received digit; and accumulator means for accumulating the incremental signals from said incrementing means for each of successively received digits, the accumulating signal approaching, in proportion, the actual difference of the amplitude levels of the two main impulse response samples of the overall data transmission system impulse resonse.

3. The device according to claim 2 wherein said adjustable reference level generating means comprises:

means for dividing the signal from said accumulator means by a preselected constant to provide a first desired threshold level and for feeding said threshold signal to said decision means;

means for providing the negative value of said first threshold signal to said decision means;

means for multiplying the signal from said dividing means by a second preselected constant to provide a second threshold level signal to said decision means;

means for providing the negative value of said second threshold level signal to said decision means;

means for multiplying the signal from said dividing means by a third preselected constant to provide a third threshold level signal to said decision means; and means for providing the negative value of said third threshold level signal to said decision means.

4. An automatic decision threshold device for producing estimates of the values of digits received over a data transmission system, comprising in combination:

decision means for comparing a sampled multilevel digital data signal received from a data transmission system, corresponding to a received digit multiplied by the mean absolute value of the main samples of the overall data transmission system impulse response, against a set of adjustable reference level signals to provide an estimate of the value of each received digit and a signal indicative of the sign of the received digit;

learning means for receiving the signals from said decision means and the sampled multiamplitude signal for learning the mean absolute amplitude level of the main samples of the overall data transmission system impulse response; and adjustable reference level generating means for receiving, in each baud, the learned, mean absolute amplitude level to provide a set of adjustable reference level signals the levels of which are in respectively corresponding proportions to the learned, mean absolute amplitude level, which set of reference level signals are fed to said decision means, for each baud, in succession.

5. An automatic decision device comprising in combination:

a decision means for comparing a sampled digital data received signal y, where the $i^{th}$ sample is $$y_i \approx l_o d_i + l_2 d_{i-2} \approx l_o D_i \approx [(l_o - l_2)/2]\ D_i$$

wherein $D_i$ is a received digit,; $l_0$ and $l_2$ are the two main impulse response amplitude samples taken at times separated by two baud intervals, $d_i$ is the $i^{th}$ transmitted digit and with which response sample $l_o$ is associated at time $i$, and $d_{i-2}$ is the digit transmitted two baud earlier and with which response sample $l_2$ is associated at time $i$, and $D_i = d_i - d_{i-2}$;

against a set of adjustable level reference threshold signals which are respectively corresponding proportions of a learned quantity $\widehat{l_o - l_2}$ comprising an estimate approaching the actual quantity $l_o - l_2$, to provide a signal proportional to an estimate $\hat{D}_i$ of the received digit, and a signal sgn $\hat{D}_i$ proportional to the sign of the estimated received digit and determined in accordance with the levels of said reference threshold signals;

first multiplier means for multiplying the signal $\hat{D}_i$ by an estimated quantity $\widehat{l_0 - l_2/2}$ to form a first product signal;

summation means for subtracting the first product signal from the signal sample $y_i$ to provide a difference signal;

second multiplier means for multiplying the difference signal by the signal Sgn $\hat{D}_i$ to form a second product signal;

incrementing means for producing an incremental signal proportional to the second product signal from said second multiplier means for each baud interval;

accumulator means for accumulating incremental signals produced by said incrementing means in successive baud intervals and providing an output signal each baud interval in proportion to $\widehat{l_o - l_2}$ which is an approximation of the actual quantity. $\widehat{l_0 - l_2}$ of the overall data transmission system impulse response;

a divider for dividing the estimated signal $\widehat{l_0 - l_2}$ by a factor of 2 and for providing said divided signal $(l_0 - l_2)/2$ to said first multiplier means; and adjustable reference level means for providing a set of reference threshold signals, the levels of which are in respectively corresponding proportions to the signal $\widehat{l_o - l_2}$.

6. An automatic decision threshold device as recited in claim 4 wherein said main samples comprise non-zero amplitude samples of the system impulse response.

7. An automatic decision threshold device as recited in claim 4 wherein said main samples comprise the samples $l_o$ and $l_2$ of a partial response coded digital data transmission, and wherein $l_o$ and $l_2$ are the non-zero amplitude samples, spaced at two baud intervals and at the sampling time, for a unit amplitude, single transmitted pulse.

8. In a receiver for receiving multilevel digital data transmitted over a transmission system, an automatic decision threshold device for estimating the value of each received digit, comprising:

means for sampling the received digital data signal at the baud rate, decision means for comparing each successive signal sample with a set of adjustable reference level signals to produce, for each sample, an estimate of each received digit, means for learning the mean absolute amplitude of the non-zero amplitude samples of the idealized impulse response of the overall data transmission system and producing a corresponding output, means for developing and comparing a signal corresponding to the product of the learned, mean absolute amplitude of the impulse response of the overall data transmission system, and the estimate of the received digit, with the received signal sample, to produce an error signal, said learning means including means for developing an incremental signal in response to each error signal and for accumulating the error signals, the error signals being of such value and sign, on the average, as to produce an accumulated value approaching the actual value of the mean absolute amplitude of the system impulse response, and means responsive to the learned, mean absolute amplitude of the system pulse response for each interval, for producing each reference level signal of the set as a respectively corresponding, predetermined proportion of the learned mean absolute amplitude of the system pulse response, for supply to said decision means.

9. In a receiver for receiving multilevel digital data transmitted over a transmission system, an automatic decision threshold device for estimating the value of each received digit, comprising:

means for sampling the received digital data signal at the baud rate, decision means for comparing each successive signal sample with a set of adjustable reference level signals to produce, for each sample, a digit value signal comprising an estimate of the amplitude value of the received digit, and a digit sign signal indicative of the sign of the received digit, means for learning the mean absolute amplitude of the non-zero amplitude samples of the idealized impulse response of the overall data transmission system and producing a corresponding output, means for multiplying the estimated digit value signal with the learned mean absolute amplitude output of said learning means to produce a first product signal, for each signal sample, in succession, means for comparing each sampled digital signal with the corresponding first product signal to produce an error signal, said means for learning the mean absolute amplitude of the system impulse response including:

second multiplier means for multiplying each error signal with the corresponding digit sign signal to produce a second product signal, incrementing means responsive to the second product signal to produce an incremental signal in each baud interval, and an accumulator for accumulating the incremental signals of successive baud intervals to develop an accumulated signal value comprising an estimated value proportional to the mean absolute amplitude of the system pulse response, the sign of the incremental signal in successive baud intervals, as accumulated, tending on the average to correct any difference between the estimated and the actual mean absolute amplitudes of the system pulse response, and means responsive to the estimated mean absolute amplitude of the system impulse response for each interval for producing each reference level signal of the set as a respectively corresponding, predetermined proportion of the estimated mean absolute amplitude of the system impulse response, for supply to said decision means.

10. An automatic decision threshold device as recited in claim 9 wherein the mean absolute amplitude of the system impulse response is in proportion to the values of the two main samples $l_0$ and $l_2$ spaced at two baud intervals and comprising the non-zero amplitude samples of a unit value, single transmitted pulse in a partial response coded transmission system.

11. An automatic decision threshold device as recited in claim 9 wherein said incrementing means multiplies the second product signal of said second multiplier means by a fixed constant.

12. An automatic decision threshold device as recited in claim 9 wherein said second multiplier comprises a binary device producing as the second product signal a sign indication of the product of the signs of the digit sign signal and the error signal from said comparing means.

13. An automatic decision threshold device as recited in claim 12 wherein said incrementing means multiplies the sign output product of said multiplying means by a fixed constant.

* * * * *